(12) United States Patent
Duncan et al.

(10) Patent No.: US 12,081,613 B2
(45) Date of Patent: *Sep. 3, 2024

(54) SYSTEMS AND METHODS FOR DECENTRALIZED DETECTION OF SOFTWARE PLATFORMS OPERATING ON WEBSITE PAGES

(71) Applicant: Capital One Services, LLC, McLean, VA (US)

(72) Inventors: Dallas Duncan, Austin, TX (US); William Henderson, Austin, TX (US); Laura Robertson, Austin, TX (US); Kace Layton, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,119

(22) Filed: Jul. 5, 2023

(65) Prior Publication Data

US 2024/0007521 A1    Jan. 4, 2024

Related U.S. Application Data

(63) Continuation of application No. 17/031,265, filed on Sep. 24, 2020, now Pat. No. 11,729,247.

(51) Int. Cl.
| | |
|---|---|
| *H04L 67/02* | (2022.01) |
| *G06F 9/54* | (2006.01) |
| *G06F 11/34* | (2006.01) |
| *G06F 16/958* | (2019.01) |
| *H04L 43/0876* | (2022.01) |

(52) U.S. Cl.
CPC .............. *H04L 67/02* (2013.01); *G06F 9/542* (2013.01); *G06F 11/34* (2013.01); *G06F 16/958* (2019.01); *H04L 43/0876* (2013.01)

(58) Field of Classification Search
None
See application file for complete search history.

(56) References Cited

U.S. PATENT DOCUMENTS

| | | |
|---|---|---|
| 7,315,826 B1 | 1/2008 | Guheen et al. |
| 7,660,815 B1 | 2/2010 | Scofield et al. |
| 8,285,656 B1 | 10/2012 | Chang et al. |
| 8,825,841 B2 | 9/2014 | Seifert et al. |
| 9,922,327 B2 | 3/2018 | Johnson et al. |
| 9,946,746 B2 | 4/2018 | Hong et al. |
| 10,127,564 B2 | 11/2018 | Heath |
| 10,380,665 B1* | 8/2019 | Rygaard ............. G06Q 30/0613 |
| 10,546,315 B2 | 1/2020 | Mitchell |
| 10,559,019 B1 | 2/2020 | Beauvais |
| 10,586,244 B2 | 3/2020 | Shiffert et al. |
| 10,764,283 B1 | 9/2020 | Blinn |
| 10,937,046 B1 | 3/2021 | Henderson et al. |
| 10,990,645 B1 | 4/2021 | Shi |
| 11,170,405 B2 | 11/2021 | Trainor |
| 11,405,189 B1 | 8/2022 | Bennison |
| 2003/0088529 A1 | 5/2003 | Klinker et al. |
| 2004/0107125 A1 | 6/2004 | Guheen et al. |
| 2005/0105513 A1 | 5/2005 | Sullivan et al. |
| 2005/0262240 A1 | 11/2005 | Drees et al. |
| 2006/0015607 A1 | 1/2006 | Fava et al. |
| 2007/0261112 A1 | 11/2007 | Todd et al. |
| 2012/0101952 A1 | 4/2012 | Raleigh et al. |
| 2013/0073366 A1 | 3/2013 | Heath |
| 2013/0073376 A1 | 3/2013 | Heath |
| 2013/0073377 A1 | 3/2013 | Heath |
| 2013/0073389 A1 | 3/2013 | Heath |
| 2013/0073400 A1 | 3/2013 | Heath |
| 2013/0336137 A1 | 12/2013 | Cohen et al. |
| 2014/0059663 A1 | 2/2014 | Rajshekar et al. |
| 2014/0324946 A1* | 10/2014 | Zhang ............... H04L 67/10 709/203 |
| 2015/0088911 A1 | 3/2015 | Qiao et al. |
| 2015/0135264 A1 | 5/2015 | Amiga |
| 2016/0119182 A1 | 4/2016 | Brown et al. |
| 2016/0253710 A1 | 9/2016 | Publicover et al. |
| 2016/0259497 A1 | 9/2016 | Foss et al. |
| 2016/0301592 A1 | 10/2016 | Douglis et al. |

(Continued)

FOREIGN PATENT DOCUMENTS

| | | |
|---|---|---|
| CN | 109189642 A | 1/2019 |

OTHER PUBLICATIONS

International Search Report and Written Opinion issued in International Application No. PCT/US2021/051666, issued Dec. 21, 2021 (21 pages).

*Primary Examiner* — Lashonda Jacobs-Burton
(74) *Attorney, Agent, or Firm* — Bookoff McAndrews, PLLC

(57) ABSTRACT

A method may include: providing a browser extension to user devices that is configured to: monitor data associated with website pages visited by the user devices; and in response to detecting that data associated with a website page is indicative of a presence of a platform, transmit a notification to an entity system, the notification including an identification of the website page and an identification of the platform; and in response to receiving the notification: generating and/or updating a database indicative of operation of the platform on one or more website pages based on the identification of the website page and the identification of the platform; quantifying a number of website pages on which the platform is operated based on the database; and determining a level of traffic to the website page.

20 Claims, 4 Drawing Sheets

(56) References Cited

U.S. PATENT DOCUMENTS

| | | |
|---|---|---|
| 2016/0330237 A1 | 11/2016 | Edlabadkar |
| 2017/0032147 A1 | 2/2017 | Denner et al. |
| 2017/0148046 A1 | 5/2017 | Akbarpour Mashadi et al. |
| 2017/0236077 A1 | 8/2017 | Venna et al. |
| 2018/0276404 A1 | 9/2018 | Dotan-Cohen et al. |
| 2019/0213654 A1 | 7/2019 | Altinsel |
| 2019/0260841 A1 | 8/2019 | Roberts et al. |
| 2019/0260879 A1 | 8/2019 | Raleigh et al. |
| 2020/0213211 A1 | 7/2020 | Jain et al. |
| 2020/0311790 A1 | 10/2020 | Keren |
| 2020/0336553 A1 | 10/2020 | Yeddula et al. |
| 2020/0387923 A1 | 12/2020 | Mitchell |
| 2020/0401586 A1 | 12/2020 | Arkhangorodsky et al. |
| 2020/0401589 A1 | 12/2020 | Arkhangorodsky et al. |
| 2021/0241351 A1 | 8/2021 | Francis et al. |
| 2021/0243160 A1 | 8/2021 | Francis et al. |
| 2021/0304242 A1 | 9/2021 | Benkreira et al. |
| 2021/0342836 A1 | 11/2021 | Cella et al. |
| 2022/0075850 A1* | 3/2022 | Ghorbani ............... G06F 21/316 |
| 2022/0210237 A1* | 6/2022 | Roberts ................ H04L 67/535 |
| 2022/0198562 A1 | 7/2022 | Cella et al. |
| 2022/0217212 A1 | 7/2022 | Davey |
| 2022/0245656 A1 | 8/2022 | Leach et al. |
| 2022/0366494 A1 | 11/2022 | Cella et al. |

\* cited by examiner

SYSTEMS AND METHODS FOR DECENTRALIZED DETECTION OF SOFTWARE PLATFORMS OPERATING ON WEBSITE PAGES

This patent application is a continuation of and claims the benefit of priority to U.S. Nonprovisional patent application Ser. No. 17/031,265, filed on Sep. 24, 2020, now U.S. Pat. No. 11,729,247, the entirety of which is incorporated herein by reference.

TECHNICAL FIELD

Various embodiments of the present disclosure relate generally to networking and Internet analytics, and, more particularly, to systems and methods for decentralized detection of an interaction platform operating on a website page.

BACKGROUND

With the widespread implementation and utilization of the Internet, a wide variety of websites may provide the opportunity for users to engage in a wide variety of activities such as engaging in commerce, communications, education, entertainment, etc. In some instances, however, a website and/or web browser by itself may not provide a feature or service that may be desirable to a user.

Programs, such as browser extensions, electronic applications, or the like, have been developed that add-on, extend, or modify the functionality, appearance, or the like of a web browser and/or website. Some examples of browser extensions include tools for bookmarking a website, sharing information on social media, or engaging in or facilitating electronic-commerce.

In some instances, a browser extension may be designed so as to be generally applicable to whatever website is visited by a user device. This design approach may have the benefit of a wide applicability, but may have the detriment of a low level of integration into any one website. For example, an e-commerce tool that is not designed with consideration of a particular e-commerce website visited by a user device may have limited visibility or interactivity with the data, functionality, or the like of that e-commerce website.

In some instances, a browser extension may be designed with consideration of a particular website. In other words, the browser extension may have functionality that is specific to the particular website, and/or functionality that is designed with a particular aspect of the website in mind. This design approach may enable features or functionality that may not be available with a more generally designed browser extension, such as modifying the appearance of the website, interactions provided by the website, or the like.

However, the widespread implementation of the Internet has led to explosive growth in the number of websites available. As a result, the task of designing a browser extension with consideration of even a small portion of extant websites that may be relevant to the browser extension may be a monumental or insurmountable task. Further, as new websites may be generated, and the functionality of existing websites may be adjusted, even the design considerations that were made for a browser extension may be obviated or outdated. As a result, designing a browser extension that includes features or functionality generally requiring consideration of particular websites to operate may be complex, costly, and/or time consuming.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for detection of an interaction platform operating on a website page. An entity may desire to provide a program such as a browser extension that modifies, extends, and/or adds on to one or more of the appearance, functionality, interactions, or the like of one or more websites. However, one or more of the features or functionality of such a browser extension may require and/or benefit from design considerations particular to an individual website or websites. Due to the vast number of websites that may be available and relevant to a particular browser extension, identifying relevant websites, let alone designing the browser extension so that it is configured to work with even a small portion of them, may be difficult, costly, time consuming, impractical, or the like. As will be discussed in more detail below, in various embodiments, systems and methods for decentralized detection of an interaction platform operating on a website page, are described. Multiple website pages may include one or more software platforms in order to, for example, implement a feature or functionality. By providing support for the browser extension per platform, rather than per individual website page, the entity may expand support of the browser extension across website pages using the platform. In an exemplary embodiment, the entity may incorporate monitoring functionality into the browser extension so that, when operated by user devices across the Internet, the browser extension acts as a decentralized detector for software platforms. Such decentralized detection may be used to register websites with the entity, provide analytics for recommending or selecting which platforms to support, and/or other actions.

In one aspect, an exemplary embodiment of a method for decentralized detection of an interaction platform operating on a website page may include: providing, via an entity system, a browser extension to one or more user devices, the browser extension configured to: monitor data associated with one or more website pages visited by a respective user device; and in response to detecting, via the monitoring, that data associated with a respective website page visited by the respective user device is indicative of a presence of a respective interaction platform operating on the respective website page, cause the respective user device to transmit a respective notification to the entity system, the respective notification including an identification of the respective website page visited by the respective user device and an identification of the respective interactive platform operating on the website page; and in response to receiving the respective notification: generating and/or updating a database indicative of operation of the respective interactive platform on one or more website pages based on the identification of the respective website page and the identification of the respective interactive platform included with the respective notification; quantifying a number of website pages on which the respective interaction platform is operated based on the database; and determining a level of traffic to the respective website page.

In another aspect, an exemplary embodiment of a method for decentralized detection of an interaction platform operating on a website page may include: receiving a respective notification from a browser extension operating on a respective user device associated with a respective user, the respective notification indicative that a respective interaction platform is associated with a respective website page visited by the respective user device, and the respective notification including an identification of the respective website page visited by the respective user device and an identification of the respective interactive platform operating on the website page; and in response to receiving the respective notification: generating and/or updating a database indicative of operation of the respective interactive platform on one or more website pages based on the identification of the respective website page and the identification of the respective interactive platform included with the respective notification; quantifying a number of website pages on which the respective interaction platform is operated based on the database; and determining a level of traffic to the respective website page.

In a further aspect, an exemplary embodiment of a system for decentralized detection of an interaction platform operating on a website page may include: a processor; and a memory storing instruction executable by the processor to perform operations. The operations may include: receiving a respective notification from a program operating on a respective user device associated with a respective user, the respective notification indicative that a respective interaction platform is associated with a respective website page visited by the respective user device, and the respective notification including an identification of the respective website page visited by the respective user device and an identification of the respective interactive platform operating on the website page; and in response to receiving the respective notification: generating and/or updating a database indicative of operation of the respective interactive platform on one or more website pages based on the identification of the respective website page and the identification of the respective interactive platform included with the respective notification; quantifying a number of website pages on which the respective interaction platform is operated based on the database; determining a level of traffic to the respective website page; and registering the respective website page for the program based on the respective notification.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
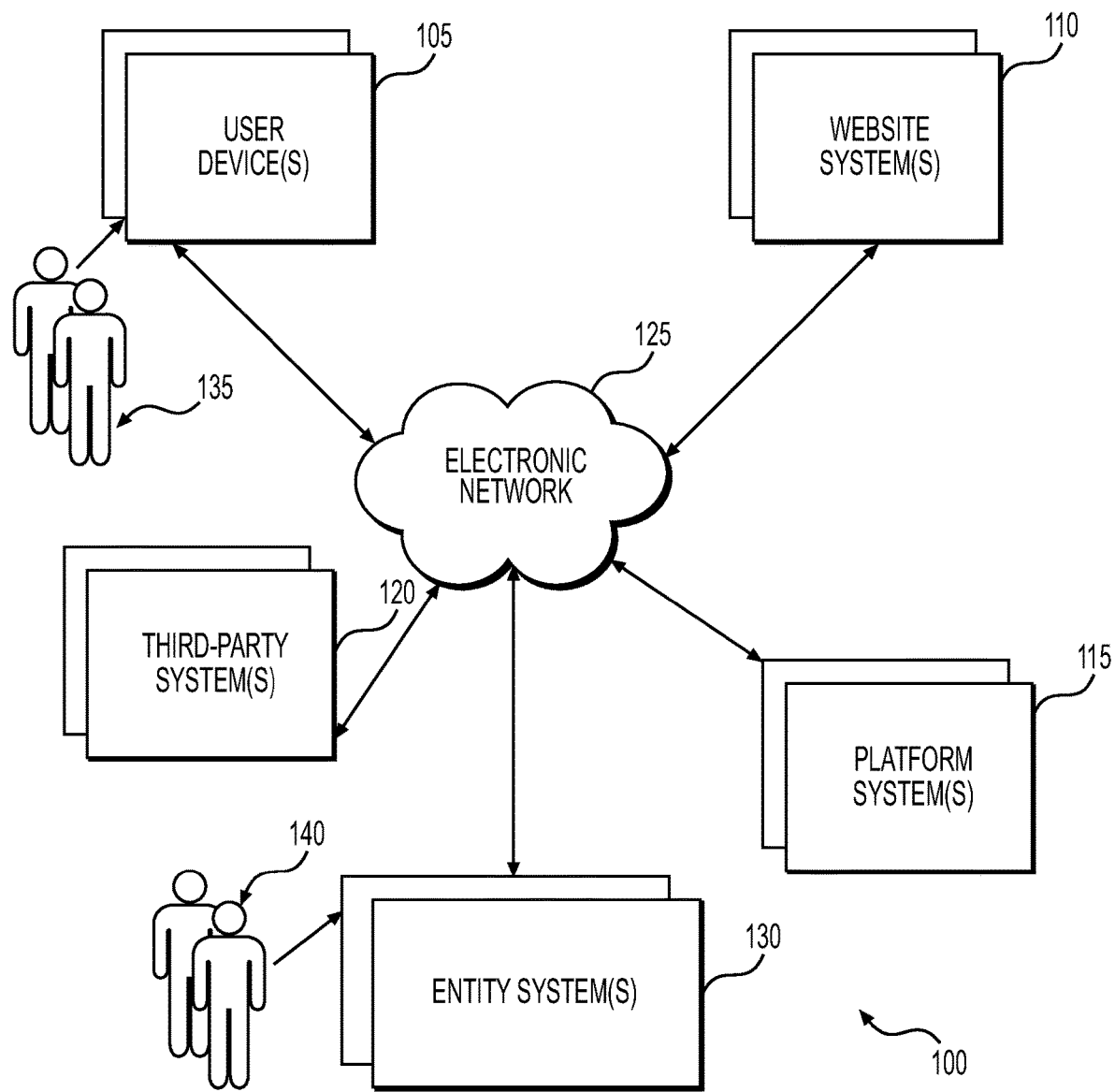
FIG. 1 depicts an exemplary computing environment for decentralized detection of an interaction platform operating on a website page, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "entity" generally encompasses an organization or person, e.g., that may be involved in providing, receiving, or using a website, program, and/or a product. An "interaction" that may be provided by a website, may include, for example, providing a good, service, resource, or the like such that the associated entity may act as a merchant, seller, dealer, renter, provider, vendor, instructor, facilitator, performer, or the like, and/or an agent or intermediary thereof. The terms "user," "customer," or the like may be used interchangeably, and generally encompasses a person interested in or engaged in an acquisition or use of a product, as well as a person that has purchased, used, or acquired a product. A "product" generally encompasses a good, service, resource, benefit, or the like having ownership or other rights that may be transferred, e.g., a "thing of value." The term "browser extension" may be used interchangeably with other terms like "program," "electronic application," or the like, and generally encompasses software that is configured to interact with, modify, override, supplement, or operate in conjunction with other software.

An entity may desire to provide a program such as a browser extension that modifies, extends, and/or adds on to one or more of the appearance, functionality, interactions, or the like of one or more websites. For example, an e-commerce entity may desire to provide a browser extension that is configured to provide incentives, discounts, and/or price comparisons for one or more e-commerce websites. In another example, a social media entity may desire to provide a browser extension that is configured to integrate social media content and/or interactions into other websites. In a further example, an educational or informational entity may desire to provide a browser extension that is configured to integrate research and/or instructional tools into websites. In an additional example, a resource entity may desire to provide a browser extension that is configured to source content, annotations, or the like from one or more websites.

However, one or more of the features or functionality of such a browser extension may require and/or benefit from design considerations particular to an individual website or websites. For example, modifying an interaction with a particular website may require knowledge and/or integration of the data and/or structure of the website. Due to the vast number of websites that may be available and relevant to a particular browser extension, identifying relevant websites, let alone designing the browser extension so that it is configured to work with even a small portion of them, may be difficult, costly, time consuming, impractical, or the like. Accordingly, improvements in technology relating to the design and integration of browser extensions are needed.

In the following description, embodiments will be described with reference to the accompanying drawings. As will be discussed in more detail below, in various embodiments, systems and methods for decentralized detection of an interaction platform operating on a website page are described.

In an exemplary use case, an entity may desire to provide a browser extension that is configured to work with a wide variety of websites that are relevant to the browser extension. In some instances, websites may incorporate a platform in order to implement features, functionality, or the like. As used herein, the term "platform" generally encompasses a program, an Application Programming Interface ("API"), data structure, data or code library, framework, plugin, website extension, or the like that may be incorporated into and/or operate in conjunction with a website in order to implement a feature or functionality into the website. In some examples, a website may implement a feature or functionality via a platform instead of uniquely designing the feature or functionality for that website. Examples of a platform may include a display platform for generating a visual appearance of a website, a data storage, organization, processing, or retrieval platform, or an interaction platform for implementing interactions amongst a website, users, programs, systems, or the like. In a particular example, an interaction platform may provide e-commerce functionality to a website. For example, the Shopify™ platform may be added to a website page in order to implement e-commerce functionality into the website page.

In some instances, instead of and/or in addition to designing a browser extension to work with one or more websites, an entity may design a browser extension to work with one or more platforms. For example, a plurality of websites may utilize a common platform to implement similar functionality, and a browser extension designed to work with a platform may thus enable features or functionality that may otherwise be associated with a browser extension designed for use with a particular website. A browser extension designed to work with one or more platforms may thus expand a number of websites for which the browser extension is designed to work with, without requiring particular design considerations for each individual website.

However, knowledge and/or visibility of what platforms are operating on what websites may be limited. Further, due to the vast number of websites available and the variety of different platforms that may be implemented, it may be difficult, costly, or time consuming, to determine what platforms may be a desirable design target and/or what websites may be usable with a browser extension having such a design.

Thus, a first entity may monitor, and/or make observations about website pages, e.g., a first website page, known to operate a first platform, e.g., an e-commerce platform. Observations may include aspects and/or patterns in the data and/or content associated with the website page. The first entity may determine one or more of the observed aspects and/or patterns that may be associated with and/or indicative of the presence of the first platform on the website page.

The first entity may generate a monitor program that is configured to identify the one or more aspects and/or patterns in data of a visited website page to detect the presence of the first platform on the visited website. In some instances, the monitor program may be configured to assign weights and/or apply a filter to the one or more aspects and/or patterns in order to determine a likelihood of the presence of the first platform.

The first entity may include the monitor program in a browser extension provided by the first entity. For example, the first entity may provide a first browser extension that provides incentives, discounts, information, offers, and/or the like for e-commerce activities. The first browser extension may be configured to detect, via the monitoring program, that a website page visited by a user device that is operating the first browser extension includes data indicative of a presence of the first platform. In response to such detection the first browser extension may be further configured to transmit a notification to an entity system of the first entity that includes an identification of the first website page and an identification of the first platform operating thereon.

Thus, the first browser extension may give the first entity visibility of website pages, such as the first website page, that include the first platform. Further, because such visibility is obtained via one or more user devices employing the first browser extension, e.g., rather than by the first entity itself, such visibility is obtained in a decentralized manner that may be more efficient, timelier, and more widespread than were the first entity to endeavor to individually search for and inspect various website pages.

Further, the first entity may utilize such visibility in order to, for example, perform analytics on the implementation and usage of the first platform on the Internet, integrate and/or register discovered website pages with the first platform for use with the first browser extension, and/or take various actions in response to the presence and/or usage of the first platform on the first website and/or on the Internet as a whole.

In another use case, a user may be associated with a user device. A first entity may provide a browser extension. The user may install the browser extension on the user device. The user may operate the user device to visit a website page. The browser extension may be configured to detect whether the website page visited by the user device includes a platform, e.g., by monitoring for one or more aspects and/or patterns of the data of the visited website page. In response to detection of a presence of the platform on the visited website page, the browser extension may determine whether the website page is registered by the first entity as associated with the platform.

In response to determining that the website page is registered by the first entity as associated with the platform, the browser extension may be configured to activate, e.g., modify a feature or functionality of the website page. For example, the browser extension may modify an interaction provided by the website page.

In response to determining that the website page is not registered by the first entity as associated with the platform, the browser extension may be configured to transmit a notification to the first entity that includes an identification of the website page and an identification of the platform operating thereon.

In a further use case, an entity may operate an entity system in order to, for example, track the implementation of one or more platforms on one or more website pages. The entity system may receive a notification, e.g., from a browser extension operating on a user device, that includes an identification of a website page and an identification of a platform operating on the website page. In response to receiving the notification, the entity system may generate and/or update a database indicative of the operation of one or more platforms on various websites based on the identifications in the received notification.

The entity system may perform analytics, e.g., based on the database. For example, the entity system may quantify a number of website pages on which the platform is operated, and/or may determine a level of traffic to the website page and/or website pages operating the platform. The entity system may also compare the quantification and determined level of traffic with other website pages and/or platforms. The entity system may register the website page for use with the browser extension. The entity system and/or the first entity may take other actions based on the database and/or the analytics. For example, the entity may determine which platforms to support for the browser extension based on the relative presence and/or traffic levels of website pages that include the platform, e.g., relative to other platforms. Thus, the entity system may enable dynamic and/or autonomous registration of websites operating a platform, and/or provide visibility of the platform on the Internet that facilitates implementation and support of the browser extension.

In another exemplary use case, a first entity may provide a browser extension associated with facilitating e-commerce. For example, the browser extension may provide coupons, incentives, comparison shopping information, or the like for one or more products that may be offered by an e-commerce website page. The first entity may desire the browser extension to be supported for use with a wide variety of website pages. The first entity may configure the browser extension to operate with one or more e-commerce platforms that may be included in one or more website pages. For example, the browser extension may be configured to provide coupons or incentives available via the one or more platforms, and/or modify an interaction with the one or more platforms. A modification may include, for example, injecting information such as comparison shopping information, capturing interaction information such as information about one or more products, or the like.

The browser extension may be configured to monitor for the presence of one or more platforms on one or more websites visited by a user device that includes the browser extension. For example, the browser extension may include a respective monitoring program configured to detect the presence of a respective one of the one or more platforms. In an example, a first monitoring program may be configured to monitor application network requests used by a visited website, and compare the monitored application network requests to application network requests predetermined to be associated with a coupon request for a first platform. For instance, one or more coupons, e.g., coupon codes, may be available for use with a particular platform and/or for a particular website. Coupon codes usable via a particular platform may result in an application network request having one or more particular aspects and/or patterns. Thus, when a user using a user device that includes the browser extension enters a coupon into a platform of a visited website, the monitoring program may observe the application network request and detect the presence of the platform based on one or more aspects and/or patterns of the observed request matching one or more aspects and/or patterns known to be associated with the platform.

In some instances detection of different aspects and/or patterns may be used to determine the registration status of a website page and to activate the browser extension. For example, in some instances, a presence of a pattern in a Uniform Resource Locator ("URL") may be used to detect a presence of a platform and determine whether the website page is registered with an entity system associated with the platform. In another example, in some instances, a presence of a selector, e.g., a button or the like, may be used to activate the browser extension. In some instances, at least a portion of the same and/or similar data is used for multiple purposes. In some instances, the notification transmitted by the browser extension may include additional information, such as information associated with the aspect and/or pattern of the data that led to the identification of the pattern, or a coupon code entered by the user. In some instances, the entity system may aggregate such additional information. For example, the entity system may track which aspects and/or patterns are more likely to be indicative of a presence of a platform and/or may aggregate coupon codes to, for example, generate a repository of coupon codes usable with the website and/or platform.

It should be understood that while several of the examples above pertain to e-commerce activity, such examples are illustrative only. The techniques and technologies of this disclosure may be adapted to any suitable activity. An exemplary use case of another suitable activity may be a browser extension configured to provide nutritional information for a recipe included on a website page. A recipe website may employ a platform for listing ingredients and/or steps of a recipe. A browser extension may be configured to determine nutritional information for the product of the recipe based on the ingredients and/or steps, and modify the website page to include such information along with the recipe. In a manner similar to the examples above, the browser extension may be configured to provide visibility of website pages that include the recipe platform, thereby enabling the first entity to register website pages with the recipe platform in a decentralized manner and obtain visibility of the operation of the recipe platform across the Internet.

Another exemplary use case of another suitable activity may be for a browser extension configured to provide information about items listed in and/or related to content of a website. A website page may employ a platform that is integrated with another browser extension, e.g., an extension configured to block certain types or kinds of content from being displayed, whereby the platform provides a whitelist for content that may otherwise be blocked. The browser extension configured to provide information about items listed in and/or related to content of a website may be additionally configured to determine information about the platform, e.g., in order to determine what type or kind of content may be blocked and/or displayed.

In a further exemplary use case of another suitable activity, a browser may be configured to determine which platform is used by a website page for displaying content, e.g., content for other entities related to items provided by such entities. The entity may thus be able to determine the presence and spread of various platforms for displaying content, and select where content for the entity may be hosted and/or provided.

FIG. 1 depicts an exemplary computing environment 100 that may be utilized with techniques presented herein. One or more user device(s) 105, one or more website system(s) 110, one or more platform system(s) 115, and/or one or more third-party system(s) 120 may communicate across an electronic network 125. As will be discussed in further detail below, one or more entity system(s) 130 may communicate with one or more of the other components of the computing environment 100. The user device 105 may be associated with a user 135. The entity system 130 may be associated with an entity 140. The systems and devices of the computing environment 100 may communicate in any arrangement. As will be discussed herein, systems and/or devices of the computing environment 100 may communicate in order to perform browser extension support, network analytics, web traffic monitoring, modification of website features, functionalities, or interactions, and/or other actions.

The user device 105 may be a computer system such as, for example, a desktop computer, a mobile device, etc. In an exemplary embodiment, the user device 105 is a cellphone, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the computing environment 100. For example, the electronic application(s) may include customer authentication tools, a digital wallet of the customer, a web browser or another application or the like configured to provide access to website pages online, such as an e-commerce store-front of a merchant, etc. In another example, the user device 105 may include a browser extension associated with the entity 140 and/or configured to operate in conjunction with another electronic application on the user device 105 such as a web browser or the like.

In some embodiments, the website system 110 may provide one or more website pages that are accessible, e.g., via the electronic network 125, to other devices and systems, e.g., the user device 105. A website page provided by the website system 110 may include one or more features, functionalities, and/or interactions, or the like. The website page may further include one or more platforms that implement, support, augment, and/or modify one or more of the features, functionalities, interactions, or the like of the website page. In an exemplary embodiment, the website page may include an e-commerce platform that implements e-commerce activity on the website page. In some embodiments, multiple website systems 110 may be associated with providing a particular website page, or vice versa.

The platform system 115 may provide one or more platforms for use with one or more websites. In some embodiments, the platform system 115 may be configured to provide the one or more platforms and/or support or interaction thereof via electronic network 125. For example, the platform system 115 may provide the e-commerce platform as a downloadable extension that may be implemented on a website. In another example, the platform system 115 may be configured to interact with the operation of a provided platform operating on a website. For instance, a platform system 115 offering the e-commerce platform may be configured to communicate with a website page that includes the e-commerce platform in order to facilitate, record, and/or execute interactions with the e-commerce platform. In some instances, a provided platform may be, for example, proprietary (e.g., Shopify®), a Software as a Service ("SaaS") (e.g., BigCommerce®) or open source (e.g., Magento, WooCommerce, OpenCart), or a hybrid thereof. In an example, a website system 110 may obtain and/or implement a platform in order to reduce, remove, obviate, or the like a necessity for the website system 110 to develop a feature or functionality implemented by the platform.

The third-party system 120 may include, for example, one or more of a financial institution, a website search system, a network traffic analysis system, or the like.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system, e.g., the website system 110, so as to be accessible online, and that may include data configured to cause a program such as a web browser to perform operations such as send, receive, or process data, generate a visual display and/or an interactive interface, or the like.

As discussed in further detail below, the entity system 130 may be configured to provide a browser extension or program configured to monitor web browsing of a user device 105 on which it is operating to detect a presence of a platform, notify the entity system 130 of the presence of the platform, and/or perform other actions with regard to a visited website such as modifying a feature, functionality, and/or interaction of the visited website, or the like.

Although depicted as separate components in FIG. 1, it should be understood that a component or portion of a component may, in some embodiments, be integrated with or incorporated into one or more other components. For example, a portion of the website system 110, e.g., a website page provided thereby, may be provided to the user device 105 as an electronic portal via the electronic application. At least a portion of the platform system 115, e.g., a platform, may be integrated into the website system 110, the user device 105, and/or the third-party system 120. Any suitable arrangement of the various systems and devices of the computing environment 100 may be used.

In the methods below, various acts are described as performed or executed by a component from FIG. 1, such as the entity system 130, the user device 105, or components thereof. However, it should be understood that in various embodiments, various components of the computing environment 100 discussed above may execute instructions or perform acts including the acts discussed below. Further, it should be understood that in various embodiments, various steps may be added, omitted, and/or rearranged in any suitable manner.

Figure 2:
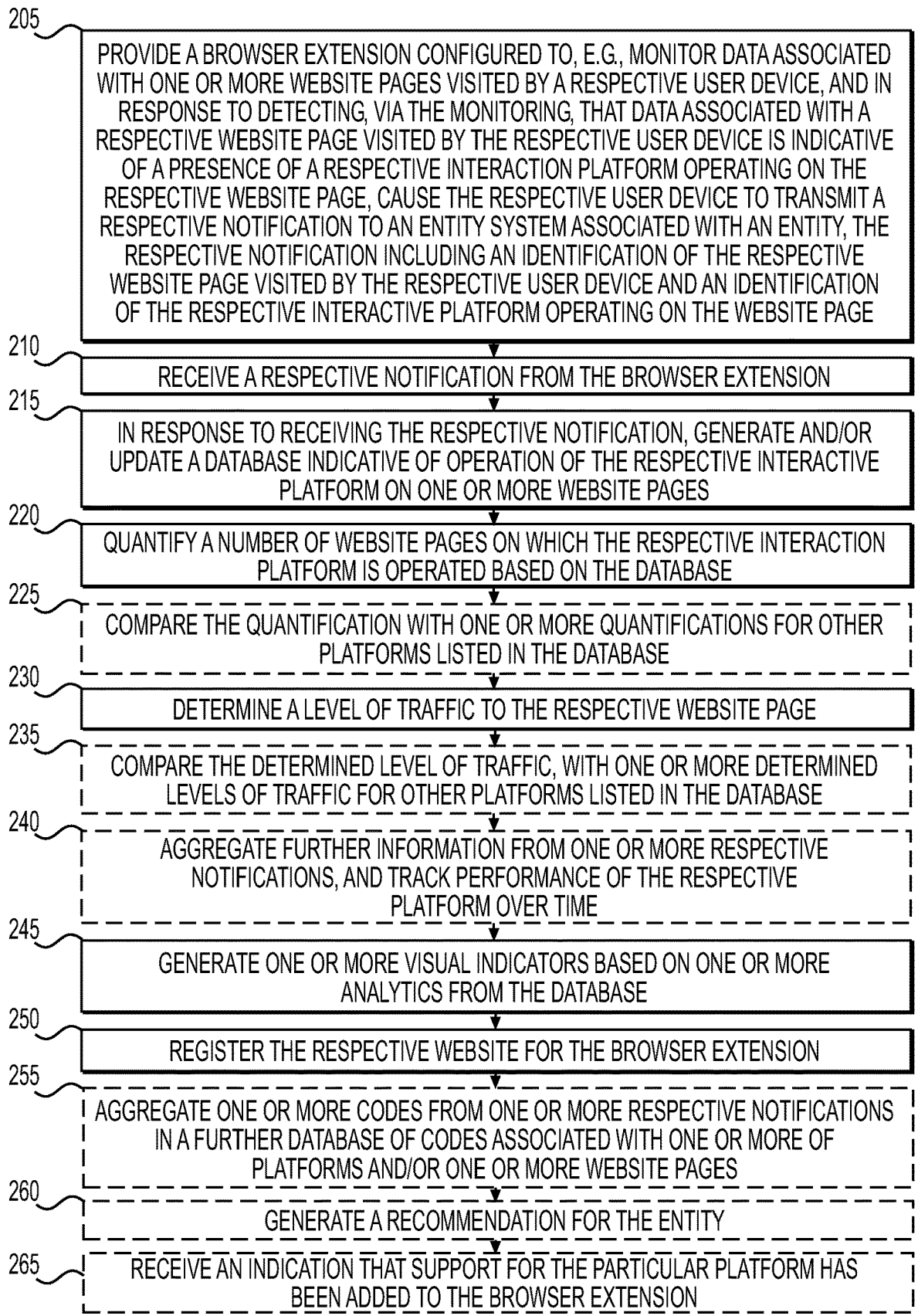
FIG. 2 depicts a flowchart of an exemplary method for decentralized detection of an interaction platform operating on a website page, according to one or more embodiments.

FIG. 2 illustrates an exemplary process for decentralized detection of an interaction platform operating on a website page, such as in the various examples discussed above. A user may have and/or be associated with a user device 105.

At step 205, an entity may provide, e.g., via an entity system 130 accessible via the electronic network 125, a browser extension. The browser extension may be configured to monitor web browsing activity of a web browser operating on a respective user device 105. For example, the browser extension may be configured to monitor data associated with one or more website pages visited by the respective user device 105.

The browser extension may be further configured to detect, via the monitoring, that data associated with a respective website page visited by the respective user device 105 is indicative of a presence of a respective platform operating on the respective website page, e.g., an interaction platform. In some embodiments, the browser extension may be further configured to monitor the data associated with the respective website page visited by the respective user device 105 by employing one or more monitor programs. Each monitor program may be configured to identify data indicative of a respective platform. In other words, the browser extension may include various different monitor programs for detecting various different platforms. The monitor program may include a listing and/or other data usable to identify the data indicative of the respective platform.

In some embodiments, the listing and/or other data usable to identify the data indicative of the respective platform may be determined by the entity, e.g., manually, via an algorithm or automated process configured to parse information from the respective platform, or combinations thereof. In some embodiments, the browser extension may be configured to identify data that may be indicative of the presence of the respective platform. For example, upon visiting a website page that is registered with the entity system 130 as associated with the respective platform, as discussed in further detail below, the browser extension may be configured to compare data from the website page with the listing and/or other data usable to identify the data indicative of the respective platform, and may transmit a notification to the entity system 130 based on the comparison in order to identify data that may be indicative of the respective platform that may not have been included in the listing and/or data. In some embodiments, the entity system 130 may be configured to aggregate such notifications, e.g., via a clustering algorithm, machine learning model, or the like, in order to determine data that is likely to be indicative of the presence of the respective platform. The entity system 130 may be configured to automatically update the listing and/or data for the browser extension, and/or such data may be updated manually by the entity.

Data associated with the respective website page that may be monitored, and thus data that may be indicative of the presence of the respective platform on the respective website may include one or more of a URL or portion thereof associated with the respective website page, a pattern in the URL of the respective website page, an interactive element included on the respective website page, a structuring of the data associated with the respective website page, a network request generated by the respective website page, a structuring and/or type of the network request generated by the respective website page (e.g., an XMLHttpRequest ("XHR"), main_frame, or the like), a method of the network request (e.g., a "Post" method), data parsed from the network request, and/or an input into the respective website page via the respective user device 105.

In some instances, implementation of a respective platform on a website page may result in the URL of the website page or a portion thereof having content or a pattern (e.g., a structure, syntax, or the like) associated with the respective platform. For example, a URL may include a term likely associated with the respective platform such as "cart," "coupon," "code," "store," "checkout," "promotion," or any other term associated with a feature or function of the respective platform. In another example, a URL may include an operator, e.g., in conjunction with a term, such as "ajax=*", or the like. Exemplary URL pattern examples include: "*://*/*/list/interactionPost*"; "*://*/interaction/ajax/add_item*"; "*://*/*websitepage-ajax=apply_submission*"; "*://*/input/?code=*", "*://*/*?action="; or the like, in which the "*" symbol is a wildcard and/or "any" symbol that may be website page specific. It should be understood that the foregoing examples are illustrative only, and that any suitable pattern in a URL may be used.

An interactive element on a website page may include a selector (e.g., a button, link, icon, or the like) that may be associated with the respective platform. A network request (e.g., an HTTP request, or the like) may include a pattern that may be associated with the respective platform. In some instances, the respective website page may be configured to generate a network request in response to an input or other interaction with the user 135 via the user device 105, or another system such as the third-party system 120 or platform system 115. For example, the user 135 may select a selector to initiate an interaction with the respective website page that causes the website page to transmit a network request to the platform system 115, e.g., in order to facilitate and/or process the interaction. Input that may be associated with the presence of the respective platform may include one or more of an inputting of a code that may be associated with the respective platform, e.g., a coupon code or the like, adding an item to a data list of the respective platform, e.g., a shopping cart or the like, etc.

The browser extension may be further configured to determine whether the respective website page is registered for the browser extension with the entity system 130. For example, in some embodiments, the browser extension may include a listing of website pages registered with the entity system 130, and may compare a URL of the one or more visited website pages with the listing. In some embodiments, in response to determining that the website page is registered with the entity system 130, the browser extension may be further configured to determine, based on the registration, a respective platform associated with the one or more website pages, and activate one or more actions, e.g., modify a feature, functionality, or interaction provided by the respective platform.

In some embodiments, the browser extension may be configured to modify the interaction of the respective platform based on one or more aspects of the data indicative of the respective platform. In other words, the data indicative of the respective platform may be indicative of one or more features, functionalities, appearances, or interactions associated with the respective platform that may be modified. A modification may include, for example, adding, replacing, and/or removing information, content, a visual aspect, or functionality to the respective website page and/or the respective platform.

The browser extension may be further configured to transmit a respective notification to the entity system 130, e.g., in response to the detection of the presence of the respective platform. In some embodiments, transmission of the notification may be in response to determining that the respective website page is not registered with the entity system 130. The respective notification may include, for example, one or more of an indication that the respective website page is not registered with the entity system 130, an identification of the respective website, an identification of the respective platform, and/or an identification or at least portion of the data indicative of the presence of the respective platform, such as a code input by the user 135 via the user device 105.

At step 210, the entity system 130 may receive the respective notification, e.g., from the browser extension via the user device 105 through the electronic network 125.

At step 215, in response to receiving the respective notification, the entity system 130 may generate and/or update a database indicative of operation of the respective interactive platform on one or more website pages. The database may include, for example, a listing of website pages and/or platforms correlated with each other. The database may include a listing, identification, and/or portion of data indicative of a presence of one or more of the platforms listed in the database. The database may include analytics information about one or more of the websites and/or one or more of the platforms such as, for example, a quantification of a number of websites that include a particular platform, an indication of a level of traffic for one or more of the websites and/or for a particular platform. Such analytics may be cumulative, tracked over time, or combinations thereof. Such analytics may include estimations based on the data in the database.

The generation and/or update to the database may be based on the respective notification, e.g., the identification of the respective website page and/or the identification of the respective interactive platform included with the respective notification.

In some embodiments, the database includes a plurality of databases, e.g., a respective database for each platform, different databases for different regions, website page content types, etc. Any suitable organization technique may be used.

At step 220, the entity system 130 may quantify a number of website pages on which the respective interaction platform is operated based on the database, e.g., generate and/or update a quantification included in the database. In some embodiments, the quantification of the number of website pages on which the respective platform is operated is tracked over time.

Optionally, at step 225, the entity system 130 may compare the quantification with one or more quantifications for other platforms listed in the database. In some embodiments, the comparison may compare quantifications for website pages that include different platforms over time.

At step 230, the entity system 130 may determine a level of traffic to the respective website page, e.g., generate and/or update a determination of the level of traffic included in the database. In some embodiments, the entity system 130 may determine a level of traffic to the respective platform, e.g., based on an aggregation or combination of traffic to each website in the database associated with the respective platform. In some embodiments, the determined level of traffic may be tracked over time.

Optionally, at step 235, the entity system 130 may compare the determined level of traffic, with one or more determined levels of traffic for other platforms listed in the database. In some embodiments, the comparison may compare levels of traffic for different platforms over time.

As noted above, in some embodiments, one or more of the quantifications of websites and/or determinations of traffic may be and/or include an estimation. For example, the listings in the database may act as samples used for determining estimates, e.g., via statistical analysis or the like. In some embodiments, one or more of the platforms may be associated with the entity 140. For example, the entity 140 may provide a further platform in addition to the browser extension, and/or the entity 140 may have an agreement and/or association with another entity that provides the further platform. The entity 140 thus, in some embodiments, may have visibility of the further platform, e.g., further data including one or more websites that include the further platform and/or a total amount of traffic for the further platform. In some embodiments, the entity system 130 may compare the further data for the further platform with the data for the further platform from the database on the entity system 130. In some embodiments, the entity system 130 may determine a relationship between the data in the database, e.g., samples provided by the browser extension, and the further data for the further platform. In some embodiments, the entity system 130 may use the determined relationship to determine estimates for other platforms listed in the database.

Any suitable technique may be used for determining the relationship and determining the estimate(s). In some embodiments, the entity system 130 may employ a machine learning model, a statistical analysis model, or the like. As used herein, a "machine learning model" includes data, algorithms, and/or instructions that are usable, along with training data, to generate a model trained to generate a particular output based on a particular input. Any suitable type of machine learning model and/or algorithm may be used, e.g., a neural network, a clustering algorithm, or the like. For example, a machine learning model may be trained based on the further data for the further platform and data from the database for the further platform to determine a relationship between the further data (e.g., based on full visibility of activity for the full platform), and the data in the database (e.g., based on samples provided by the browser extension). The determined relationship may be usable and/or configured to determine an estimate of full activity of a particular platform based on the data for the particular platform from the database.

As noted above, in some embodiments, the notification from the browser extension may include information associated with and/or at least a portion of the data indicative of the presence of the respective platform, and in some embodiments such information and/or data may include further information associated with an interaction provided and/or facilitated by the respective platform. In some embodiments, the further information may include data associated with a performance of the platform. For example, for an e-commerce platform, a performance may be associated with a monetary amount associated with an interaction, a savings rate associated with one or more coupon codes or the like, etc.

Optionally, at step 240, the entity system 130 may aggregate the further information from one or more respective notifications, and track the performance of the respective platform over time. In some embodiments, the entity system 130 may compare the performance of different platforms.

At step 245, the entity system 130 may generate one or more visual indicators based on one or more analytics from the database, e.g., one or more of the quantifications of website pages, determinations of traffic levels, and/or performances for one or more of the platforms listed in the database. In some embodiments, the one or more visual indicators may include a graph, e.g., depicting one or more of the analytics over time. In some embodiments, the one or more visual indicators may include a comparison of one or more analytics for one or more of the platforms. In some embodiments, the one or more visual indicators may be output to the entity 140 via a display of the entity system 130, or the like.

At step 250 the entity system 130 may register the respective website for the browser extension. In some embodiments, the registration of the respective website is based on and/or in response to the respective notification, and/or in response to the indication that the respective website page is not registered. The registration, in various embodiments, may be in the form of data entered into the database and/or another listing or location. In some embodiments, the registration includes updating a listing or data to be provided to the browser extension, e.g., an update to a listing of website pages on which the browser extension may be configured to activate. In some embodiments, an update to the browser extension may include one or more of a modification, addition, or inclusion of instructions, a script, or the like for activating one or more features or functionalities of the browser extension in response to a visit to the respective website page by a user device 105 that includes the browser extension. In some embodiments, the registration of the respective website page includes generating and/or modifying the instructions, script, or the like for the browser extension. In some embodiments, instructions for the respective website page may include applying pre-existing instructions or a pre-existing script that are associated with the respective platform, and/or adapting the pre-existing script or instructions to the respective website page. In some embodiments, the browser extension is configured to request and/or receive updates, e.g., updates to a listing of registered website pages, from time to time. Once registered, a subsequent visit to the respective website by a respective user device 105 that includes the browser extension may cause the browser extension to activate one or more activities, e.g., by implementing instructions, a script, or the like associated with the respective website page, as discussed above.

As noted above, in some embodiments, the browser extension may include a code, e.g., a coupon code, entered by the user 135 into a platform on the respective website. In some embodiments, the browser extension may be further configured to transmit data including the code to the entity system 130, e.g., in the respective notification as discussed above.

Optionally, at step 255, the entity system 130 may aggregate one or more codes from one or more respective notifications in a further database of codes associated with one or more of platforms and/or one or more website pages. In other words, in some embodiments, the entity system 130 may employ the browser extension to collect codes, e.g., coupon codes, used with one or more platforms on one or more websites such that subsequent users 135 that have a user device 105 that includes the browser extension may benefit from the use of such codes(s). In some embodiments, the browser extension and/or the entity system 130 may be configured to track the usage of one or more codes over time in order to, for example, determine when a code is successfully used and/or is rejected, remove a rejected code from the further database, determine an optimal code for a respective user 135, e.g., a coupon code of a highest value to the user 135.

Optionally, at step 260, the entity system 130 may generate a recommendation for the entity 140. The recommendation may include a selection of one or more platforms for adding support for the browser extension, a recommendation for one or more of the platforms for initiating an incentive program, or the like. The recommendation may be based on one or more of the analytics. For example, the entity system 130 may determine that a particular platform that is not supported by the browser extension has a particular amount of traffic (e.g., a predetermined threshold amount) and/or is operating on a particular number of websites (e.g., a predetermined threshold number), and may generate a recommendation for adding support for the particular platform based on such determination(s).

Optionally, at step 265, the entity system 130 may receive an indication, e.g., from the entity 140, that support for the particular platform has been added to the browser extension, e.g., via an update to the browser extension.

Figure 3:
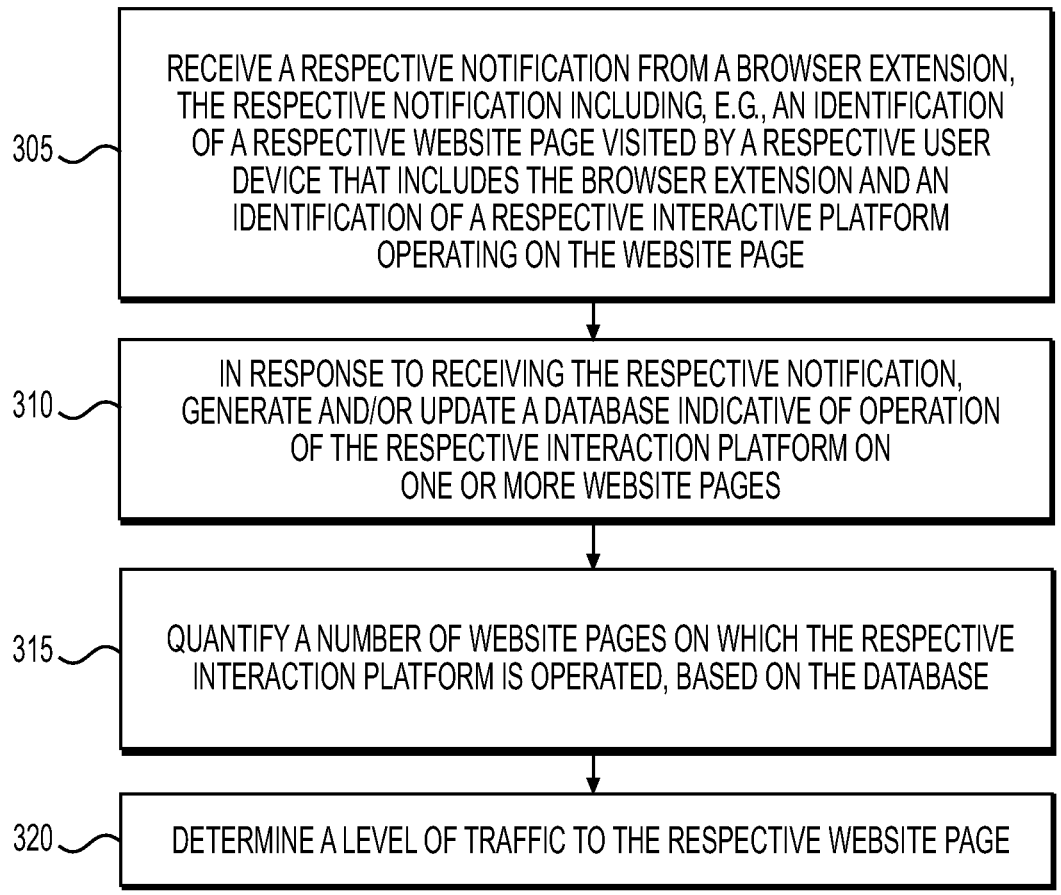
FIG. 3 depicts a flowchart of another exemplary method for decentralized detection of an interaction platform operating on a website page, according to one or more embodiments.

FIG. 3 illustrates another exemplary process for decentralized detection of an interaction platform operating on a website page. At step 305, an entity system 130, e.g., associated with an entity 140, may receive a respective notification from a browser extension. The browser extension may be operating on a respective user device 105 associated with a respective user 135. The respective notification may be indicative that a respective interaction platform is associated with a respective website page visited by the respective user device 105. The respective notification may include an identification of the respective website page visited by the respective user device 105 and an identification of the respective interactive platform operating on the website page.

At step 310, in response to receiving the respective notification, the entity system 130 may generate and/or update a database indicative of operation of the respective interactive platform on one or more website pages. The generation and/or update may be based on the identification of the respective website page and the identification of the respective interactive platform included with the respective notification.

At step 315, the entity system 130 may quantify a number of website pages on which the respective interaction platform is operated, based on the database, e.g., in a manner similar to step 220 above with regard to FIG. 2.

At step 320, the entity system 130 may determine a level of traffic to the respective website page, e.g., in a manner similar to step 230 above with regard to FIG. 2.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the process illustrated in FIGS. 2-3, may be performed by one or more processors of a computer system, such any of the systems or devices in the computing environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 4:
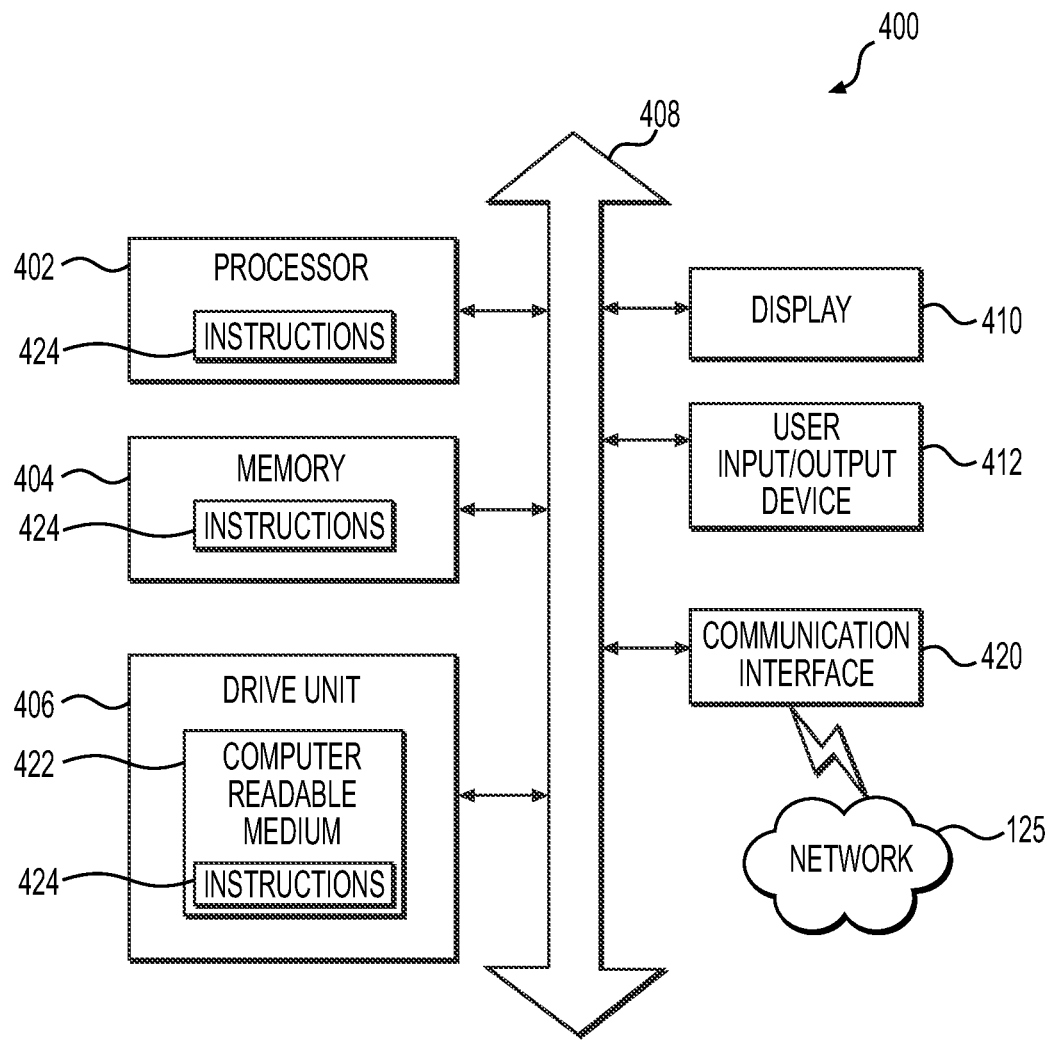
FIG. 4 depicts an example of a computing device, according to one or more embodiments.

FIG. 4 is a simplified functional block diagram of a computer 400 that may be configured as a device for executing the methods of FIGS. 2-3, according to exemplary embodiments of the present disclosure. For example, the computer 400 may be configured as the entity system 130 and/or another system according to exemplary embodiments of the present disclosure. In various embodiments, any of the systems herein may be a computer 400 including, for example, a data communication interface 420 for packet data communication. The computer 400 also may include a central processing unit ("CPU") 402, in the form of one or more processors, for executing program instructions. The computer 400 may include an internal communication bus 408, and a storage unit 406 (such as ROM, HDD, SDD, etc.) that may store data on a computer readable medium 422, although the computer 400 may receive programming and data via network communications. The computer 400 may also have a memory 404 (such as RAM) storing instructions 424 for executing techniques presented herein, although the instructions 424 may be stored temporarily or permanently within other modules of computer 400 (e.g., processor 402 and/or computer readable medium 422). The computer 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for automatically modifying a user interface via injection, comprising:

monitoring, via a first electronic application operating on a user device, website pages visited by a second electronic application also operating on the user device;

detecting, via the first electronic application and based on the monitoring, that data associated with a respective website page visited by the user device is indicative of a presence on the respective website page of a respective e-commerce payment platform from amongst a plurality of different e-commerce payment platforms; and in response to the detecting and via the first electronic application, executing a respective code injection that is specific to the respective e-commerce payment platform to the respective website page, wherein the respective code injection is configured to cause a modification of a user interface of the respective e-commerce payment platform on the respective website to include at least one interface element associated with the first electronic application.

2. The computer-implemented method of claim 1, wherein the monitoring includes employing a respective monitor program that is specific to each of the plurality of different e-commerce payment platforms.

3. The computer-implemented method of claim 2, wherein each of the respective monitor programs is configured to detect data on the respective website page specific to a corresponding one of the plurality of different e-commerce payment platforms.

4. The computer-implemented method of claim 3, wherein the data on the respective website page specific to the corresponding e-commerce payment platform includes one or more of a pattern in a URL of the respective website page, an interactive element included on the respective website page, a structuring of the data associated with the respective website page, a network request generated by the respective website page, a structuring of the network request generated by the respective website page, or interaction data associated with an input of an e-commerce payment code into the website page via the user device.

5. The computer-implemented method of claim 4, wherein:
the data includes the interaction data; and
the computer-implemented method further includes transmitting the code or a combination of the code and a response of the respective website page to the input of the code to an entity system associated with the first electronic application.

6. The computer-implemented method of claim 1, wherein the modification of the user interface includes an injection of a display of information unavailable on the respective website page.

7. The computer-implemented method of claim 6 wherein the display of information includes one or more of information regarding an alternative available at a different website page unassociated with the respective website page, information regarding one or more characteristics of an item displayed by the respective website page, or an interaction associated with the first electronic application.

8. The computer-implemented method of claim 1, wherein the monitoring includes:
transmitting a query to an entity system associated with the first electronic application to determine whether the respective website page is registered by the entity system as associated with one of the plurality of e-commerce payment platforms; and
receiving a response to the query from the entity system that identifies the respective e-commerce payment platform.

9. The computer-implemented method of claim 1, wherein the monitoring includes:
transmitting a query to an entity system associated with the first electronic application to determine whether the respective website page is registered by the entity system as associated with one of the plurality of e-commerce payment platforms;
receiving a response to the query from the entity system indicating that the respective website page is not registered with the entity system;
employing a respective monitor program that is specific to each of the plurality of different e-commerce payment platforms; and
identifying the respective e-commerce payment platform based on an identification by one of the respective monitor programs.

10. The computer-implemented method of claim 9, further comprising:
transmitting a notification to the entity system, the notification configured to cause the entity system to register the respective website page as associated with the respective e-commerce payment platform.

11. A system for automatically modifying a user interface via injection, comprising:
at least one memory storing instructions, a first electronic application, and a second electronic application; and
at least one processor operatively connected to the at least one memory, and configured to execute the instructions to perform operations, including:
monitoring, by the at least one processor and via the first electronic application, website pages visited by the second electronic application;
detecting, by the at least one processor, via the first electronic application, and based on the monitoring, that data associated with a respective website page visited by the second electronic application is indicative of a presence on the respective website page of a respective e-commerce payment platform from amongst a plurality of different e-commerce payment platforms; and
in response to the detecting, by the at least one processor, and via the first electronic application, executing a respective code injection that is specific to the respective e-commerce payment platform to the respective website page, wherein:
the respective code injection is configured to cause a modification of a user interface of the respective e-commerce payment platform on the respective website to include at least one interface element associated with the first electronic application; and
the modification of the user interface includes an injection of a display of information unavailable on the respective website page, the display of information including one or more of information regarding an alternative available at a different website page unassociated with the respective website page, information regarding one or more characteristics of an item displayed by the respective website page, or an interaction associated with the first electronic application.

12. The system of claim 11, wherein:
the at least one memory further stores a respective monitor program that is specific to each of the plurality of different e-commerce payment platforms; and
the monitoring includes employing the respective monitor programs.

13. The system of claim 12, wherein each of the respective monitor programs is configured to detect data on the respective website page specific to a corresponding one of the plurality of different e-commerce payment platforms.

14. The system of claim 13, wherein the data on the respective website page specific to the corresponding e-commerce payment platform includes one or more of a pattern in a URL of the respective website page, an interactive element included on the respective website page, a structuring of the data associated with the respective website page, a network request generated by the respective website page, a structuring of the network request generated by the respective website page, or interaction data associated with an input of an e-commerce payment code into the website page via the system.

15. The system of claim 14, wherein:
the data includes the interaction data; and
the operations further include transmitting the code or a combination of the code and a response of the respective website page to the input of the code to an entity system associated with the first electronic application.

16. The system of claim 11, wherein the monitoring includes:
transmitting a query to an entity system associated with the first electronic application to determine whether the respective website page is registered by the entity system as associated with one of the plurality of e-commerce payment platforms; and
receiving a response to the query from the entity system that identifies the respective e-commerce payment platform.

17. The system of claim 11, wherein the monitoring includes:
transmitting a query to an entity system associated with the first electronic application to determine whether the respective website page is registered by the entity system as associated with one of the plurality of e-commerce payment platforms;
receiving a response to the query from the entity system indicating that the respective website page is not registered with the entity system;
employing a respective monitor program that is specific to each of the plurality of different e-commerce payment platforms; and
identifying the respective e-commerce payment platform based on an identification by one of the respective monitor programs.

18. The system of claim 17, wherein the operations further include:
transmitting a notification to the entity system, the notification configured to cause the entity system to register the respective website page as associated with the respective e-commerce payment platform.

19. The system of claim 11, wherein the second electronic application is an e-commerce application associated with an entity.

20. A non-transitory computer-readable medium comprising instructions for automatically modifying a user interface via injection, the instructions executable by at least one processor to perform operations, including:
monitoring, via a first electronic application operating on a user device, website pages visited by a second electronic application also operating on the user device, wherein:
the monitoring includes employing a respective monitor program that is specific to each of a plurality of different e-commerce payment platforms;
each of the respective monitor programs is configured to detect data on the respective website page specific to a corresponding one of the plurality of different e-commerce payment platforms;
the data on the respective website page specific to the corresponding e-commerce payment platform includes one or more of a pattern in a URL of the respective website page, an interactive element included on the respective website page, a structuring of the data associated with the respective website page, a network request generated by the respective website page, a structuring of the network request generated by the respective website page, or interaction data associated with an input of an e-commerce payment code into the website page via the user device;
detecting, via the first electronic application and based on the monitoring, that data associated with a respective website page visited by the user device is indicative of a presence on the respective website page of a respective e-commerce payment platform from amongst the plurality of different e-commerce payment platforms;
in response to the detecting and via the first electronic application, executing a respective code injection that is specific to the respective e-commerce payment platform to the respective website page, wherein the respective code injection is configured to cause a modification of a user interface of the respective e-commerce payment platform on the respective website to include at least one interface element associated with the first electronic application; and
transmitting a notification to an entity system, the notification configured to cause the entity system to register the respective website page as associated with the respective e-commerce payment platform.

* * * * *